US005501144A

United States Patent [19]
Bryson

[11] Patent Number: 5,501,144
[45] Date of Patent: Mar. 26, 1996

[54] PRESS FOR COMPRESSING THE CONTENTS OF A FOOD CAN

[76] Inventor: Keith Bryson, 3 Beachcrop Ct., Delran, N.J. 08075

[21] Appl. No.: 317,604

[22] Filed: Oct. 6, 1994

[51] Int. Cl.[6] ........................................................ B30B 9/06
[52] U.S. Cl. .............................. 100/116; D7/665; 99/508; 100/135; 100/213; 100/266; 100/910; 210/464
[58] Field of Search ........................................ 100/104, 110, 100/116, 126, 130–135, 213, 234, 243, 264, 265, 266, 276, 910; 99/506, 508; 210/464–477; D7/665, 666, 686, 687

[56] References Cited

U.S. PATENT DOCUMENTS

| 34,241 | 1/1862 | Codding | 100/116 |
|---|---|---|---|
| D. 45,533 | 3/1914 | Johnson | D7/686 |
| D. 311,116 | 10/1990 | Pentland | D7/666 |
| D. 330,313 | 10/1992 | Green | D7/666 |
| D. 343,995 | 2/1994 | Djelmane | D7/666 |
| 468,023 | 2/1892 | Condon | 100/126 |
| 572,936 | 12/1896 | Waters et al. | 100/213 |
| 692,262 | 2/1902 | Geering | 100/264 |
| 1,255,629 | 2/1918 | Mueller | 100/116 |
| 1,446,220 | 2/1923 | Stinebring | 100/132 |
| 3,995,544 | 12/1976 | Farley | 100/213 |
| 4,860,647 | 8/1989 | Kerslake | 100/234 |
| 4,988,019 | 1/1991 | Dawes | 222/189 |
| 5,272,968 | 12/1993 | Keville et al. | 100/110 |
| 5,272,969 | 12/1993 | McDonald | 100/234 |
| 5,363,759 | 11/1994 | D'Ambrosio | 100/110 |

Primary Examiner—Stephen F. Gerrity
Attorney, Agent, or Firm—Eric A. LaMorte

[57] ABSTRACT

A hand held press used to remove the liquid packing fluids in a can of food by biasing the lid of the can against the contents of the can. The press includes an upper pressing element and a lower pressing element. The upper pressing element has a perforated region that acts as a strainer. The perforated region is advanced against the lid and into the can, wherein displaced packing fluids are collected within a receiving area defined within the perforated region. A pour spout then allows the collected fluids to be removed in a controlled manner. The lower pressing element retains the can in a predetermined orientation as the can is being pressed. Accordingly, the angle at which the displaced fluids will pour is controlled by the manipulation of the press and the can of food held firmly within the press.

14 Claims, 4 Drawing Sheets

5,501,144

PRESS FOR COMPRESSING THE CONTENTS OF A FOOD CAN

BACKGROUND OF THE INVENTION

1. Field of the Invention

The present invention relates to manually operated presses. More particularly, the present invention relates to a manual press capable of biasing the lid of a food can against the contents of the food can for the purpose of displacing liquid from the food can in a controlled fashion.

2. Prior Art Description

Many canned foods such as tuna, salmon, shrimp, pickled vegetables and the like are packed in liquids that must be removed from the can before the food is removed. The traditional way to remove the liquids from such cans is to open the can with a can opener, invert the can and manually press the lid of the can against the contents of the can. Such a traditional manual method has many disadvantages. First, when manually pressing a can lid against the contents of the can, the liquid in the can inevitably contacts the person's hands or arm. In such cases as canned fish, the liquid is often pungent and is difficult to wash off because the fish oils get absorbed by the skin. Another disadvantage is that once a can is opened with a can opener, the edges of both the can and the lid are very sharp. As a person manually advances the lid into the can, there exists a danger of the person cutting his/her fingers on one of these sharp edges. A similar danger occurs when a person tries to remove the lid from the can. In such a scenario, a person tries to engage the sharp edge of the lid in order to lift the lid out of the can.

Yet another disadvantage of manually pressing lids against the contents of cans is that many people are physically incapable of pressing the lid against the contents of the can with enough force to displace the unwanted liquids. As a result, people with arthritis or similar ailments cannot properly drain many canned foods.

The prior art record is replete with numerous presses for pressing fruit, garlic and other foods. For example, U.S. Pat. No. 4,988,019 to Dawes, entitled COMPACT PORTABLE DISPENSING SYSTEM FOR EDIBLES SUCH AS TEA, shows a simple manually operated pressing system for compressing a wet tea bag. However, the prior art now known to the applicant does not disclose a press specifically designed to compress the lid of a food can against the contents of a food can. Presses do exist for compressing the contents of a box for packing, as exemplified by U.S. Pat. No. 933,660 to Nelson, entitled FRUIT BOX PRESS and U.S. Pat. No. 983,391 to Naslin, entitled BOX NAILING FRUIT PRESS. However, such presses are not adaptable for use in compressing the contents of a food can because of their size, complexity and expense.

A need therefore exists in the art for a portable lightweight press specifically designed to press the lid of a food can against the contents of the can.

A need also exists for such a press that enables the liquids in a food can to drain without contacting the person using the press.

A need also exists for such a press that helps remove the lid from a can after compression, thereby eliminating the dangers of a person cutting his/her finger on the sharp edges of the can or the lid.

The above listed needs are provided for by the present invention as described below and claimed.

BRIEF DESCRIPTION OF THE DRAWINGS

For a better understanding of the present invention, reference is made to the following description of exemplary embodiments thereof, considered in conjunction with the accompanying drawings, in which.

SUMMARY OF THE INVENTION

The present invention is a hand held press used to remove the liquid packing fluids in a can of food by biasing the lid of the can against the contents of the can. The press includes an upper pressing element and a lower pressing element. The upper pressing element has a perforated region that acts as a strainer. The perforated region is advanced against the lid and into the can, wherein displaced packing fluids are collected within a receiving area defined within the perforated region. A pour spout then allows the collected fluids to be removed in a controlled manner. The lower pressing element retains the can in a predetermined orientation as the can is being pressed. Accordingly, the angle at which the displaced fluids will pour is controlled by the manipulation of the press and the can of food held firmly within the press.

DETAILED DESCRIPTION OF THE PRESENT INVENTION

The present invention is a hand held press used to press the lid of a can against the contents of the can, after the can lid has been separated from the can with a can opener. Although the present invention press can be used to compress the contents of many types and shapes of cans, it is especially effective in compressing short, wide cans such as those in which tuna fish is traditionally packed. Consequently, the below described drawings are directed toward an exemplary embodiment of the present invention press wherein the press is used to compress the lid of a tuna can against the tuna contained within the can.

Figure 1:
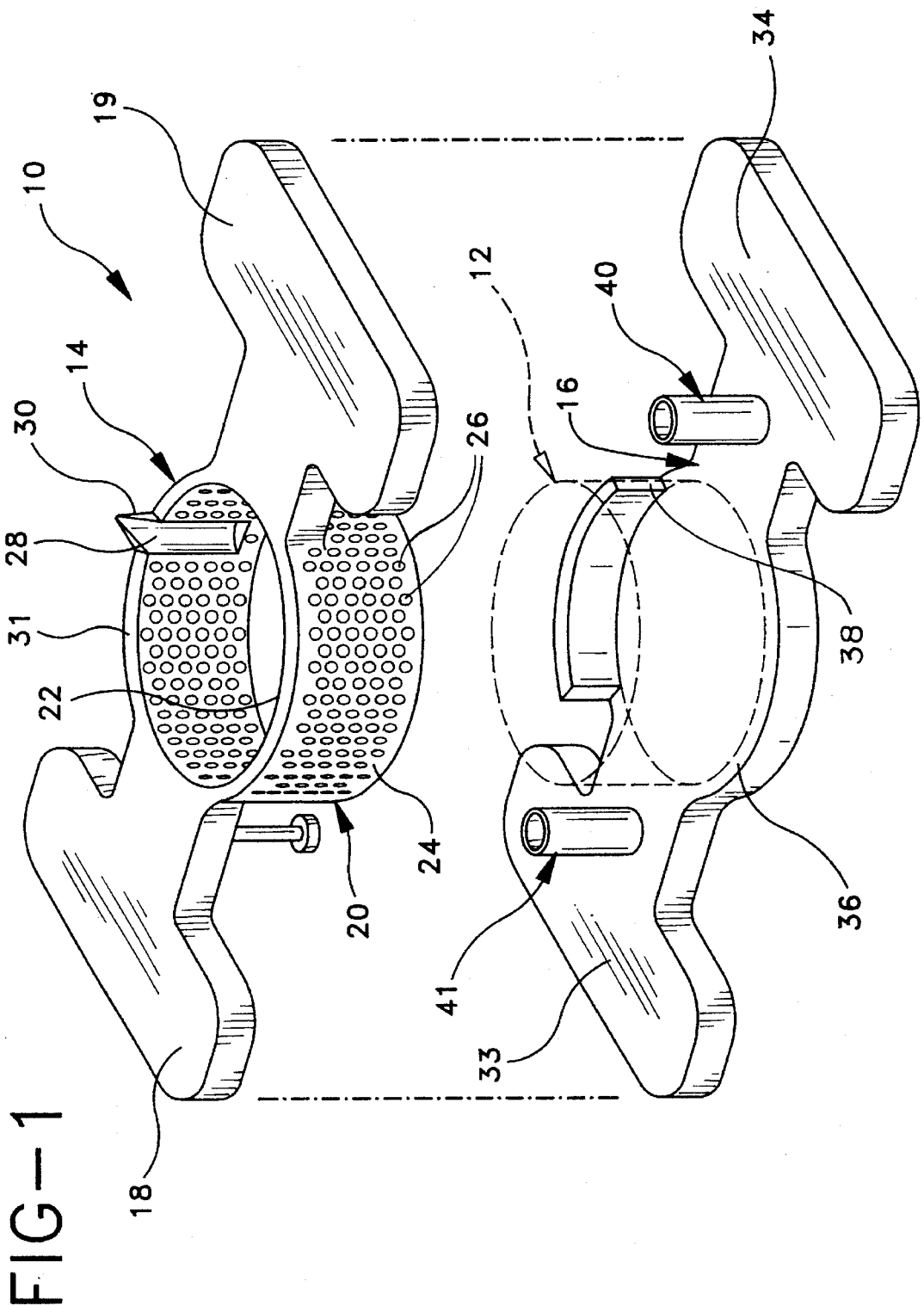
FIG. 1 is a partially exploded perspective view of one preferred embodiment of the present invention shown in conjunction with a ghost image of a can of tune fish to promote further consideration and discussion.

Referring to FIG. 1, a preferred embodiment of the present invention press 10 is shown in conjunction with the ghost image of a can of tuna fish 12 that has been opened by a can opener. The present invention press 10 contains two pressing elements 14, 16 in between which is placed the can of tuna fish 12. The upper pressing element 14 has two enlarged handles 18, 19 at either end that provide the upper pressing element 14 with a generally dog bone shaped configuration. In the center of the upper pressing element 14 is a cylindrical structure 20 that extends downwardly toward the opposite lower pressing element 16. The cylindrical structure 20 is hollow, thereby defining a tubular region having an interior surface 22 and a larger exterior surface 24. Perforations 26 extend through the cylindrical structure 20 from the exterior surface 24 through to the interior surface 22. An optional groove 28 is formed on the interior surface 22. The groove 28 partially extends into the cylindrical structure 20 and terminates at a spout element 30 that extends above the upper edge 31 of the cylindrical structure 20. The purpose of the spout element 30 and groove 28 will be later explained.

The lower pressing element 16 also has two enlarged handles 33, 34 at either end that are the same shape as the handles 18, 19 on the upper pressing element 14. A flat circular region 36 is disposed in between the two handles 33, 34. An arcuate wall 38 extends upwardly from the flat circular region 36 toward the above positioned upper pressing element 16. The arcuate wall 38 acts as a stop for the can of tuna fish 12, wherein when the can of tuna fish 12 is placed on the flat circular region 36 and pushed against the arcuate wall 38, the can of tuna fish 12 is concentrically aligned directly below the cylindrical structure 20 of the upper pressing element 14.

Figure 2:
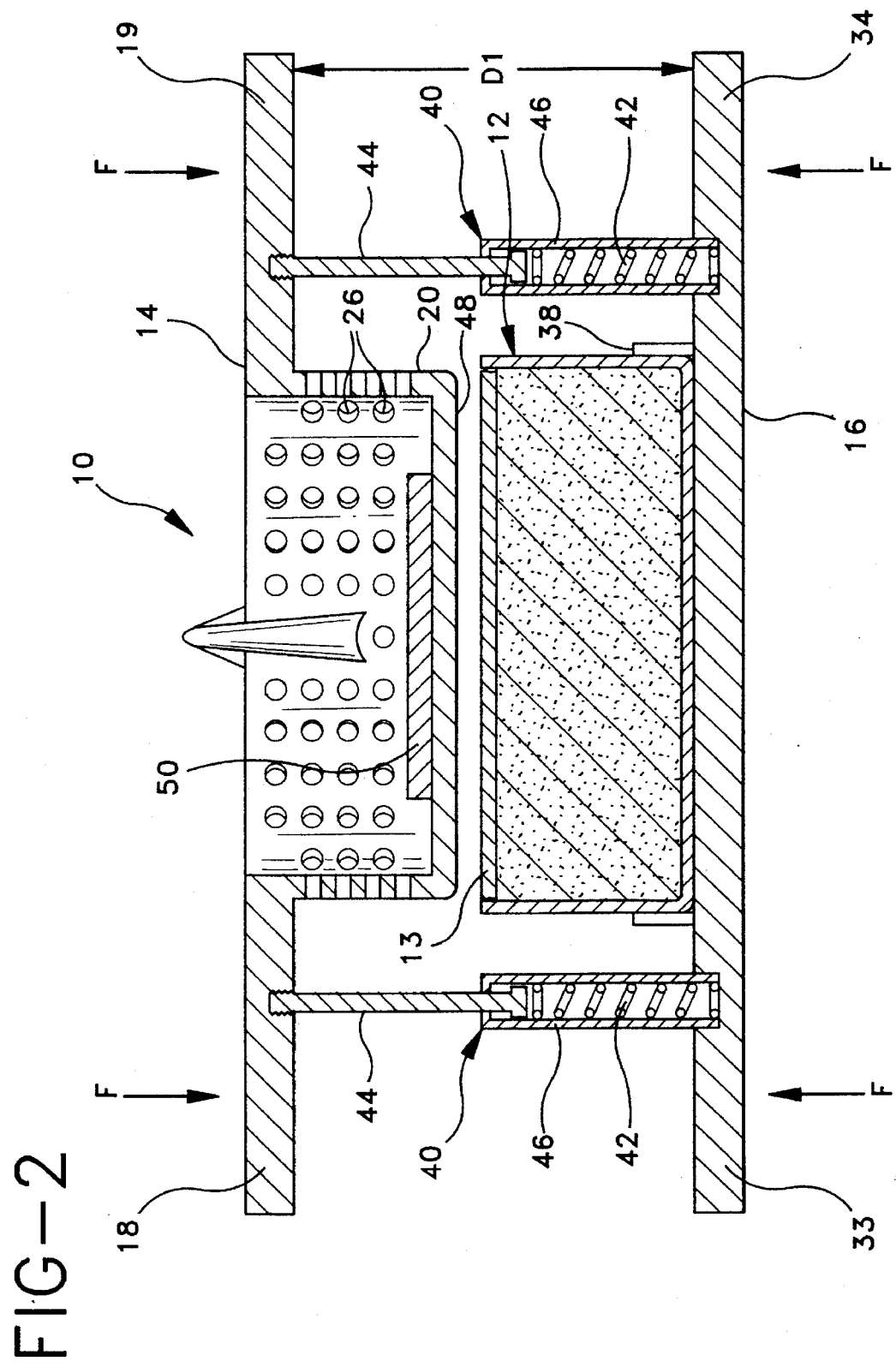
FIG. 2 is a cross-sectional view of the embodiment of FIG.1 viewed along section line 2—2.

Referring to FIG. 2 in conjunction with FIG. 1, it can be seen that the upper pressing element 14 and the lower pressing element 16 are joined together by at least two collapsible assemblies 40. In the shown embodiment, only two collapsible assemblies 40 are shown, however, it should be understood that any plurality may be used. As can be seen in FIG. 2, a spring 42 is disposed within each of the collapsible assemblies 40. The spring 42 biases the upper piston members 44 upwardly within the lower cylinder members 46. The upper piston members 44 are anchored to the upper pressing element 14. Similarly, the lower cylinder members 46 are anchored to the lower pressing element 16. As a result, the bias of the springs 42, that biases the upper piston members 44 away from the lower cylinder elements 46, causes the upper pressing element 14 and the lower pressing element 16 to be biased apart. In FIG. 2, the upper pressing element 14 and the lower pressing element 16 are positioned a distance D1 apart. It will be understood that by manually applying a squeezing force F between the upper handles 18, 19 and the lower handles 33, 34, the distance D1 between the upper pressing element 14 and the lower pressing element 16 can be reduced until the springs 42 reach a point of maximum compression.

It will be understood that the described functional components of the collapsible assemblies 40 are merely exemplary and any functionally device capable of aligning the upper and lower pressing elements 14, 16 and biasing them apart can be used in place and stead of the collapsible assemblies 40 specifically described. For example, simple springs may be interposed between the upper and lower pressing elements 14, 16, wherein the simple springs bias the upper and lower pressing elements apart yet allow the upper and lower pressing elements to be pressed together.

In FIG. 2 it can be seen that when a can of tuna fish 12 is placed between the upper and lower pressing elements 14, 16, the arcuate wall 38 extending from the lower pressing element 16 causes the can of tuna fish 12 to concentrically align below the cylindrical structure 20 that descends from the upper pressing element 14. Squeezing force F is then applied between the upper handles 18, 19 and the lower handles 33, 34. Both the upper handles 18, 19 and the lower handles 33, 34 are large, thereby enabling a person to grab and squeeze the handles together in a comfortable and easy manner.

Figure 3:
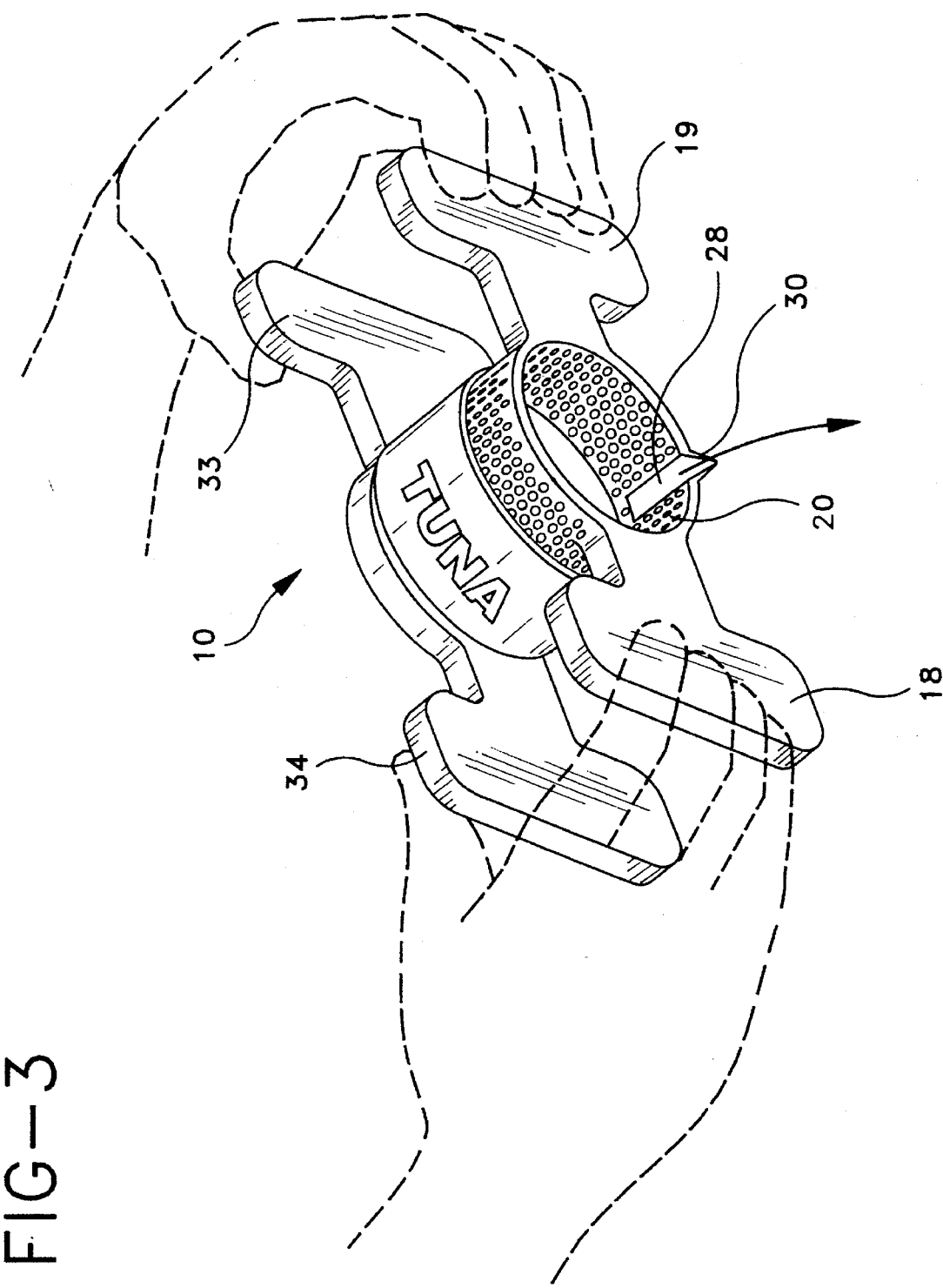
FIG. 3 is perspective view of the present invention in use as it is being squeezed by a user's hands.

Referring to FIG. 3 in conjunction with FIG. 2, it can be seen that the present invention press 10 is preferably squeezed by placing the palms and thumb on the lower handles 33, 34, while the remaining four fingers extend to, and engage, the upper handles 18, 19. Such a squeezing action requires very little dexterity, thereby enabling an elderly person or person with arthritis to use the press.

In FIG. 2 it can be seen that as the squeezing force F is applied between the upper pressing element 14 and the lower pressing element 16, the bottom surface 48 of the cylindrical structure 20 is biased against the lid 13 to the can of tuna fish 12. Accordingly, squeezing force F drives the lid 13 into the can of tuna fish 12, thereby displacing any liquids that may be present within the can. The displaced liquid raises above the lid 13 wherein the liquid passes through the perforations 26 formed in the cylindrical structure 20. In FIG. 3, it can be seen that to operate the present invention press 10, the press is tilted so that the groove 28 in the cylindrical structure 20 is the lowest point in the cylindrical structure 20. As a result, all the liquids displaced from the can of tuna 12 collect in the groove 28. The groove 28 therein guides the flow of the displaced liquid to the spout element 30, whereby the displaced liquid can be neatly directed into a desired receptacle. As can be seen, the user's hands never touch the liquid displaced from the can, thereby making the squeezing operation much more neat and sanitary. Additionally, a person's hands never have to enter the open can, thereby removing the dangers presented by the sharp edges of the can.

Returning to FIG. 2, it can be seen that a magnet 50 is disposed on the bottom of the cylindrical structure 20. As the cylindrical structure 20 is biased against the lid 13 of the can 12, the magnet 50 attracts the lid 13, thereby joining the lid 13 to the cylindrical structure 20. Accordingly, after the can of tuna 12 is drained and the squeezing force F removed, the upper pressing element 14 moves away from the lower pressing element 16 under the bias of springs 42. Since the lid 13 is magnetically attached to the cylindrical structure 20, the cylindrical structure 20 lifts the lid 13 out of the can 12. This eliminates the need for a person to place his/her hand into the can of tuna 12 and risk a cut by grabbing and pulling the lid from the can.

Figure 4:
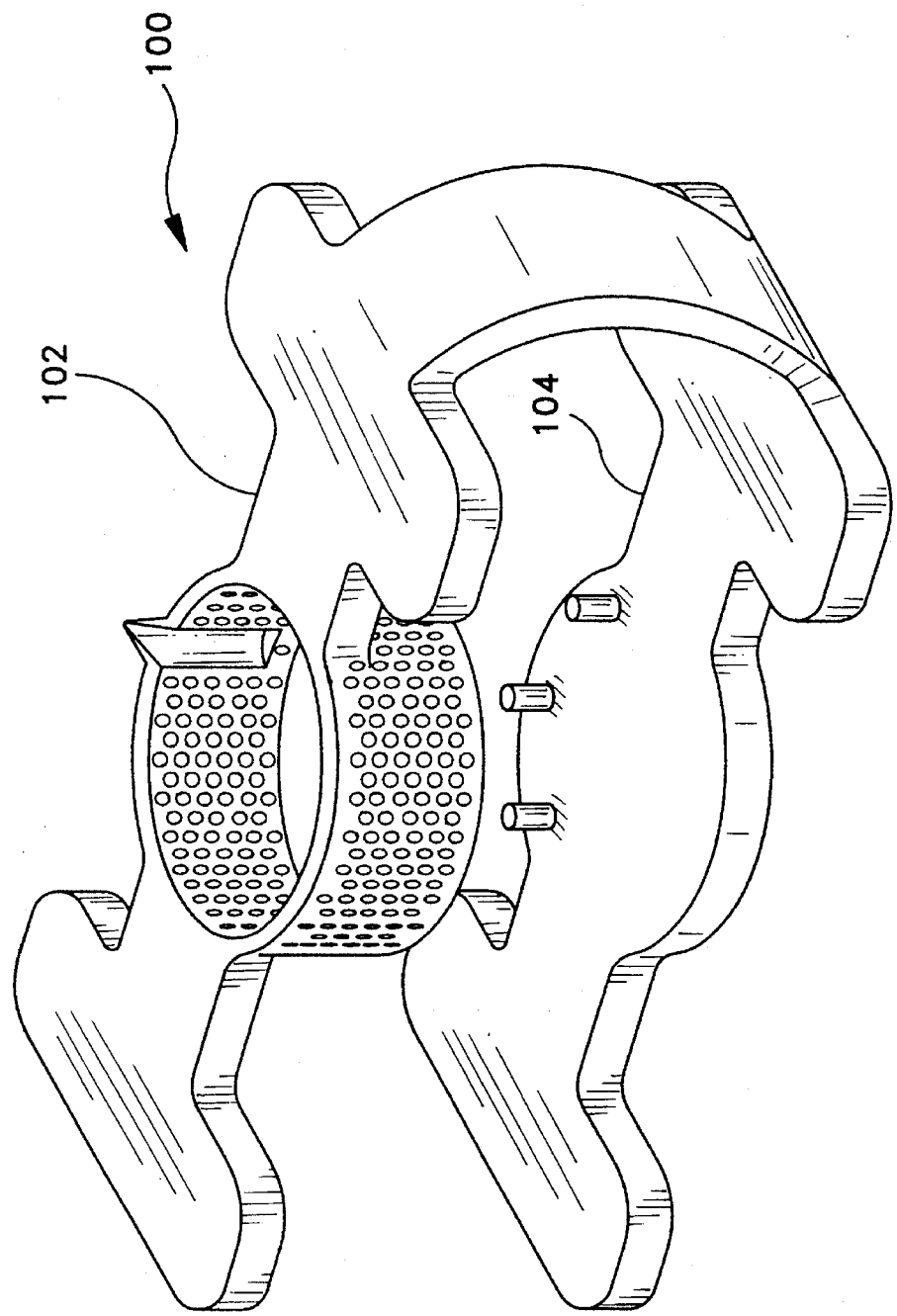
FIG. 4 is a perspective view of an alternative embodiment of the present invention.

Referring now to FIG. 4, an alternate embodiment of the present invention hand press 100 is shown. In this embodiment, the upper pressing element 102 and the lower pressing element 104 are unistructurally molded or stamped from a plastic material. The upper pressing element 102 and the lower pressing element 104 may be connected by a living hinge of thin plastic that binds the upper and lower pressing elements together, yet enables the upper pressing element 102 to be positioned above the lower pressing element 104 and pressed against the lower pressing element 104. Alternatively, the upper pressing element 102 and lower pressing element 104 need not be physically attached or may be attached by a flexible band of material or the like.

The alternate embodiment of FIG. 4 is used to show that the upper and lower pressing elements of the present invention can be joined in any manner, or not joined at all, provided that the two plates can be aligned and biased toward each other. A means for joining the upper and lower pressing elements that biases the two elements apart is preferred because it facilitates the easy removal of the hand press from around a can and its compressed contents.

From the above, it will be understood that the embodiments described herein are merely exemplary and that a person skilled in the art may make variations and modifications without departing from the spirit and scope of the present invention. For example, the physical shape of the pressing elements can clearly be altered without adversely effectively the operation of the present invention. All such variations and modifications are intended to be included within the scope of the invention as defined in the appended claims.

What is claimed is:

1. A hand press device for pressing the lid of an open can against the contents of the can, comprising:

a first pressing element having a retaining means thereon for retaining the can in a fixed orientation;

a second pressing element positionable over the can, said second pressing element having a generally cylindrical structure extending therefrom, wherein said generally cylindrical structure is hollow having an interior, an exterior and perforations extending in between said interior and said exterior, said cylindrical structure terminating at an engagement surface that engages the lid of the open can when the can is interposed between said first pressing element and said second pressing element; and handle members disposed on said first pressing element and said second pressing element for enabling said first pressing element and said second pressing element to be gripped in the hands of the user, wherein said first pressing element and said second pressing element can be physically biased toward one another thereby evenly pressing the lid against the contents of the open can.

2. The device according to claim 1, further including a means disposed between said first pressing element and said second pressing element for biasing said first pressing element and said second pressing element apart.

3. The device according to claim 1, further including a means disposed on said second pressing element for engaging and retaining the lid, whereby the lid is removed from the can when the second pressing element is moved out of the can.

4. The device according to claim 3, wherein said means includes a magnet that magnetically retains the lid.

5. The device according to claim 1, wherein the contents of the can contains liquids and said second pressing element contains a means for collecting the liquid displaced from the contents of the can as the lid is advanced against the contents of the can.

6. The device according to claim 5, wherein said means for collecting the liquid includes a spout element that enables the liquid to be poured from said second pressing element in a controlled fashion.

7. The device according to claim 1, further comprising said cylindrical structure having generally opposite sides and said second pressing element having two handle members, and wherein said two of said handle members extend from said generally opposite sides of said cylindrical structure on said second pressing element.

8. The device according to claim 7, wherein two of said handle members extend from said first pressing element and align with the two handle members on said second pressing element when said first pressing element and said second pressing element engage the can.

9. The device according to claim 1, further including a means for aligning said first pressing element and said second pressing element in a predetermined orientation as said first pressing element and said second pressing element are physically biased toward one another.

10. The device according to claim 1, wherein said first pressing element and said second pressing element are physically connected to one another.

11. A press for biasing the lid of an open can against the contents of the can, comprising:

a straining element disposed between a first handle and a second handle, wherein said straining element is sized to fit within said can;

a base structure having a positioning means thereon for positioning the can in a set orientation as said straining element is biased against the lid and into the can, said base structure having handles that align below said first handle and said second handle as said strainer is biased against the lid and into the can.

12. The press according to claim 11, wherein said straining element includes a pouring spout.

13. The press according to claim 11, further including a means for biasing the straining element away from said base structure.

14. The press according to claim 11, further including a means for aligning said straining element in a predetermined orientated relative to said base structure as the straining element is biased against the lid and into the can.

* * * * *